United States Patent
Bello et al.

(10) Patent No.: US 10,296,737 B2
(45) Date of Patent: May 21, 2019

(54) SECURITY ENFORCEMENT IN THE PRESENCE OF DYNAMIC CODE LOADING

(71) Applicant: International Business Machines Corporation, Armonk, NY (US)

(72) Inventors: Luciano Bello, Gothenburg (SE);
Pietro Ferrara, White Plains, NY (US);
Marco Pistoia, Amawalk, NY (US);
Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 212 days.

(21) Appl. No.: 14/964,162

(22) Filed: Dec. 9, 2015

(65) Prior Publication Data
US 2017/0169212 A1 Jun. 15, 2017

(51) Int. Cl.
*G06F 21/51* (2013.01)
*G06F 21/56* (2013.01)

(52) U.S. Cl.
CPC ............ *G06F 21/51* (2013.01); *G06F 21/562* (2013.01); *G06F 21/566* (2013.01)

(58) Field of Classification Search
CPC ........ G06F 21/51; G06F 21/52; G06F 21/562; G06F 21/566
USPC ................................................. 726/1, 23–25
See application file for complete search history.

(56) References Cited

U.S. PATENT DOCUMENTS

| | | | | |
|---|---|---|---|---|
| 5,963,739 A | * | 10/1999 | Homeier | G06F 9/44589 714/E11.209 |
| 6,487,716 B1 | * | 11/2002 | Choi | G06F 8/443 712/244 |
| 6,996,516 B1 | * | 2/2006 | Kimura | G06F 8/75 703/13 |
| 7,437,718 B2 | * | 10/2008 | Fournet | G06F 21/577 717/133 |
| 7,836,433 B2 | * | 11/2010 | Fanning | G06F 11/3612 717/120 |
| 7,962,798 B2 | * | 6/2011 | Locasto | G06F 11/1438 714/38.1 |
| 9,075,995 B2 | | 7/2015 | England et al. | |

(Continued)

FOREIGN PATENT DOCUMENTS

WO WO2013052121 A1 4/2014

*Primary Examiner* — Eric W Shepperd
*Assistant Examiner* — Peiliang Pan
(74) *Attorney, Agent, or Firm* — Daniel P. Morris; McGinn IP Law Group, PLLC

(57) ABSTRACT

A method (and structure) for enforcing a security policy includes retrieving from a memory a program to be verified against a security policy and a security specification defining the security policy. A static program analysis is performed on the program, using a processor on a computer, to determine whether the program is compatible with the security specification. The program is rejected if the program is determined by the static program analysis as being incompatible with the security specification. If the program is determined during the static program analysis as compatible with the security specification under static analysis criteria, then building a call-graph representation of the program for use to evaluate any dynamically-loaded code during an execution of the program. Any paths, if any, of the call-graph representation that reach at least one policy-relevant operation is marked.

18 Claims, 4 Drawing Sheets

(56) References Cited

U.S. PATENT DOCUMENTS

| | | | | |
|---|---|---|---|---|
| 9,223,972 B1* | 12/2015 | Vincent | | G06F 21/566 |
| 9,317,399 B2* | 4/2016 | Boshernitsan | | G06F 11/3672 |
| 2002/0129343 A1* | 9/2002 | Pinter | | G06F 8/434 |
| | | | | 717/140 |
| 2005/0108562 A1* | 5/2005 | Khazan | | G06F 11/3604 |
| | | | | 726/23 |
| 2005/0223028 A1* | 10/2005 | Geiner | | G06F 8/4442 |
| 2006/0075492 A1* | 4/2006 | Golan | | G06F 21/55 |
| | | | | 726/22 |
| 2006/0080635 A1* | 4/2006 | Anwar | | G06F 9/44521 |
| | | | | 717/100 |
| 2007/0277222 A1* | 11/2007 | Pouliot | | G06F 21/552 |
| | | | | 726/1 |
| 2008/0072214 A1* | 3/2008 | Peyton | | G06F 21/577 |
| | | | | 717/133 |
| 2009/0292791 A1* | 11/2009 | Livshits | | G06F 9/4443 |
| | | | | 709/217 |
| 2010/0131721 A1* | 5/2010 | Title | | G06F 21/51 |
| | | | | 711/154 |
| 2010/0199264 A1* | 8/2010 | Maeda | | G06F 11/3688 |
| | | | | 717/127 |
| 2010/0284527 A1* | 11/2010 | Fink | | G06T 11/206 |
| | | | | 379/112.06 |
| 2010/0333201 A1* | 12/2010 | Haviv | | G06F 8/43 |
| | | | | 726/22 |
| 2011/0107316 A1* | 5/2011 | Gutz | | G06F 8/433 |
| | | | | 717/157 |
| 2012/0023486 A1* | 1/2012 | Haviv | | G06F 21/577 |
| | | | | 717/126 |
| 2012/0023553 A1* | 1/2012 | Berg | | G06F 21/577 |
| | | | | 726/4 |
| 2012/0054727 A1* | 3/2012 | Joukov | | G06F 9/44505 |
| | | | | 717/168 |
| 2012/0102474 A1* | 4/2012 | Artzi | | G06F 8/75 |
| | | | | 717/157 |
| 2012/0131540 A1* | 5/2012 | Mendis | | G06F 8/77 |
| | | | | 717/101 |
| 2012/0284792 A1* | 11/2012 | Liem | | G06F 9/4426 |
| | | | | 726/22 |
| 2013/0024942 A1* | 1/2013 | Wiegenstein | | G06F 11/3604 |
| | | | | 726/25 |
| 2013/0152204 A1* | 6/2013 | Pistoia | | G06F 8/43 |
| | | | | 726/25 |
| 2014/0096113 A1* | 4/2014 | Kuehlmann | | G06F 11/3676 |
| | | | | 717/126 |
| 2014/0123293 A1* | 5/2014 | Tripp | | G06F 21/577 |
| | | | | 726/25 |
| 2014/0317748 A1* | 10/2014 | Guarnieri | | G06F 11/3644 |
| | | | | 726/25 |
| 2015/0067830 A1 | 3/2015 | Johansson et al. | | |
| 2015/0161393 A1* | 6/2015 | Pistoia | | G06F 21/577 |
| | | | | 726/25 |
| 2015/0242636 A1* | 8/2015 | Khan | | G06F 21/577 |
| | | | | 726/25 |
| 2015/0309813 A1* | 10/2015 | Patel | | G06F 8/75 |
| | | | | 703/22 |
| 2016/0021174 A1* | 1/2016 | De Los Santos Vilchez | | H04L 43/10 |
| | | | | 709/201 |
| 2016/0314301 A1* | 10/2016 | Johns | | G06F 21/577 |
| 2017/0132414 A1* | 5/2017 | Johansson | | G06F 21/566 |
| 2017/0371635 A1* | 12/2017 | Davidson | | G06F 8/52 |

* cited by examiner

SECURITY ENFORCEMENT IN THE PRESENCE OF DYNAMIC CODE LOADING

FIELD OF INVENTION

The present invention relates to security on computers. More specifically, a security policy is enforced for programs that potentially perform dynamic code loading by first statically verifying whether the code maintains the security policy so that only the dynamic portions of code will be verified on-the-fly during actual execution.

BACKGROUND

Dynamic code loading allows applications to incorporate code that is not statically declared to be included in them. Such code may originate either from a remote location or from within their local resources. For a benign application, this is an effective way to preserve intellectual property (IP) as well as hide security-sensitive app behaviors. This is because dynamically loaded code cannot be scanned statically, or at least, if the code is available as part of the app's resources, that becomes significantly more complicated than directly analyzing the declared code of the application.

Unfortunately, there are also great benefits to malicious applications in leveraging dynamic code loading. The same rationale of evading static checks and disguising the behavior of certain portions of the code is at play when it comes to malicious functionality. This remains a big problem that existing solutions for security detection and/or enforcement are largely unable to cope with.

One conventional method disambiguates malicious vs benign apps by statically analyzing the context in which a security-critical operation is performed. Another conventional method teaches a method for dynamic code instrumentation. Still another conventional method concerns application-level anomaly detection, and presents the technique of utilizing a wrapping layer around the application to collect indications of potentially anomalous behaviors and to then react to such cases.

The present invention takes a different approach from all of these conventional methods. While anomaly detection is an effective means to identify objectionable code behaviors, the present invention presents an approach that applies a specification, in contrast to just detecting unexpected behaviors. For this approach, anomaly detection alone is not sufficient.

SUMMARY

In an exemplary embodiment and unlike the conventional methods described above, the present invention combines both static and dynamic analyses, thereby having the advantages of both. These analyses are also applied relative to a given security policy as described as a specification that is provided as an input into the system.

DETAILED DESCRIPTION

Before describing the steps comprising the methods of the present invention, some concrete examples are given of what a policy S may be. The method described herein is, of course, general, and the purpose of these examples is only to add clarity to the description.

A first example is of a policy P1 that forbids the program P from sending private user fields (like the device ID or location) to remote websites with the exception of some predefined whitelist of domains, for example, the backend of the mobile app. A second example, which is more strict, is a policy P2 that disallows the execution of any security-critical operation from dynamically loaded code. These two examples will be used in the following description of an exemplary embodiment of the present invention.

Figure 1:
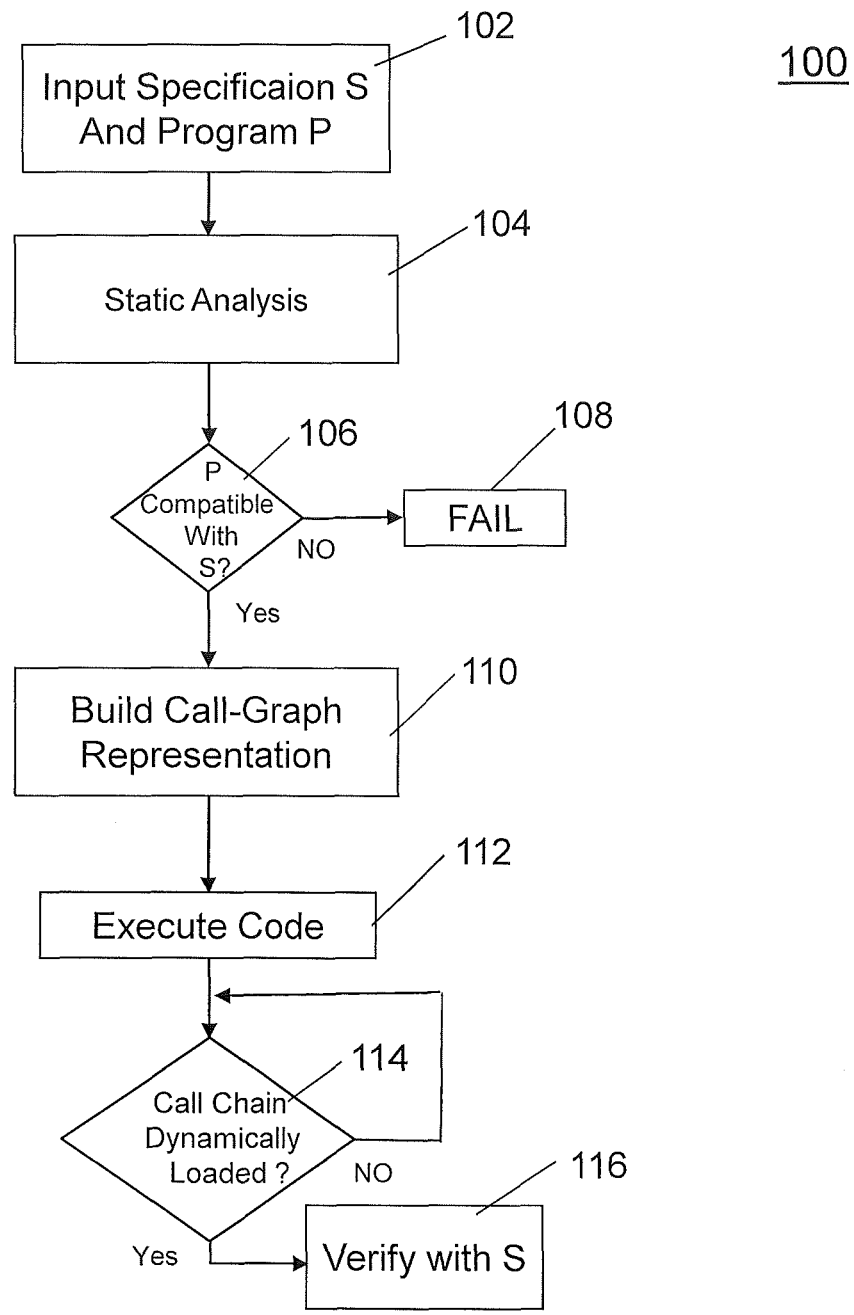
FIG. 1 shows a flowchart 100 of an exemplary embodiment of the present invention.

As exemplarily shown in FIG. 1, an exemplary embodiment assumes a given program P and a given specification S as the inputs in step 102.

1. Static Program Verification:

In step 104, a static program analysis is applied to P to verify whether, in step 106, it is compatible with the specification S. For the example of P1, the static analysis may be in the form of taint tracking, which starts at APIs that read private fields (like getDeviceId( )) and checks whether they reach internet APIs, where if the domain is not statically known or not compatible with the whitelist, then a violation is flagged. For the example of P2, the static analysis simply approves the app, as a violation would only be flagged, in step 108, if security-critical operations are executed from dynamically loaded code. An application that fails the first step is already deemed objectionable. Otherwise we proceed to the next step.

2. Code Instrumentation:

In step 110, the second step is to build a call-graph representation of the program, and derive from it all inter-procedural control-flow paths (i.e., p1, p2, . . . , pn) that start at a call-graph root and reach a policy-relevant operation. All methods along such paths are then instrumented to denote that they have been verified (in the previous step) by the policy checker.

3. Residual Runtime Verification:

During program execution in step 112, when a call chain ending in a security-critical operation arises, the instrumentation trace is checked in step 114 to determine whether some, or all, of the methods on the call chain were dynamically loaded. If not, then there is no need for further checking, which is the main benefit of first performing static verification. Otherwise, in step 116, the policy is checked with respect to the observed call chain. For the illustrative policies above, P1 checks whether the device ID is embedded into the internet transmission, whereas P2 blocks the network operation due to its being a security-critical operation (transitively) invoked by dynamically loaded code.

From the discussion and examples above, it can be seen that the present invention presents a new method to enforce security policies over programs that potentially perform dynamic code loading, and does so using a hybrid technique that combines static and dynamic analysis.

Given program P and policy S as inputs into the system, this new approach first statically verifies whether S holds over P while disregarding (the possibility of) dynamically loaded code. If so, then the next step is to apply instrumentation to P to mark security-critical chains as verified. Any security-critical chain that arises at runtime and was not previously verified (statically) is verified on the fly with respect to the policy. In this way, dynamically loaded code is identified as such and subjected to the security policy specified by the user. Further, performance is optimized as static analysis has already been applied to all the statically available code, and so the only task for runtime enforcement is residual verification of the compatibility of dynamically loaded code with the policy.

The method of the present invention could be implemented as a standalone security program, or it could be implemented as a security module that is part of another application program. Moreover, although the method of the present invention could be implemented on any computer-based device, including mobile devices, it could also be implemented as a service available to users via, for example, a network server or even as a cloud service. The service provided on a network server or cloud service would likely also provide different security specifications so that client users could select one of various security levels when their app is checked out.

Accordingly, rather than attempt to describe the many potential hardware platforms upon which the present invention could be launched, the hardware aspects of the invention will describe the more involved embodiment as having been implemented in a cloud computing environment.

Exemplary Hardware Aspects, Using a Cloud Computing Environment

It is understood in advance that, although this section of the disclosure provides a detailed description on cloud computing, implementation of the teachings recited herein are not limited to a cloud computing environment. Rather, embodiments of the present invention are capable of being implemented in conjunction with any other types of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
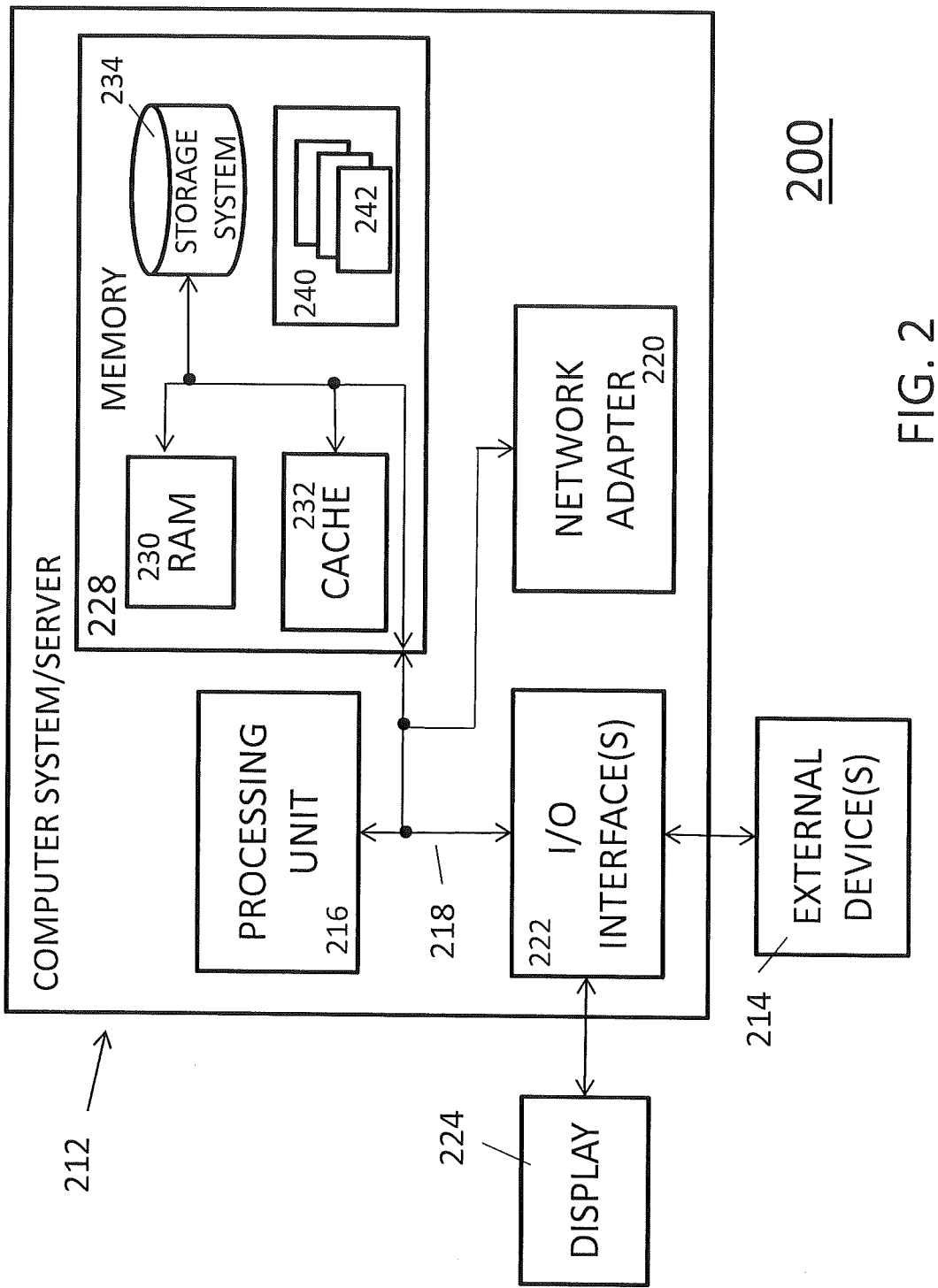
FIG. 2 depicts a cloud computing node 200 according to an exemplary embodiment of the present invention.

Referring now to FIG. 2, a schematic 200 of an example of a cloud computing node is shown. Cloud computing node 200 is only one example of a suitable cloud computing node and is not intended to suggest any limitation as to the scope of use or functionality of embodiments of the invention described herein. Regardless, cloud computing node 200 is capable of being implemented and/or performing any of the functionality set forth hereinabove.

In cloud computing node 200 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 212 in cloud computing node 200 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

Figure 3:
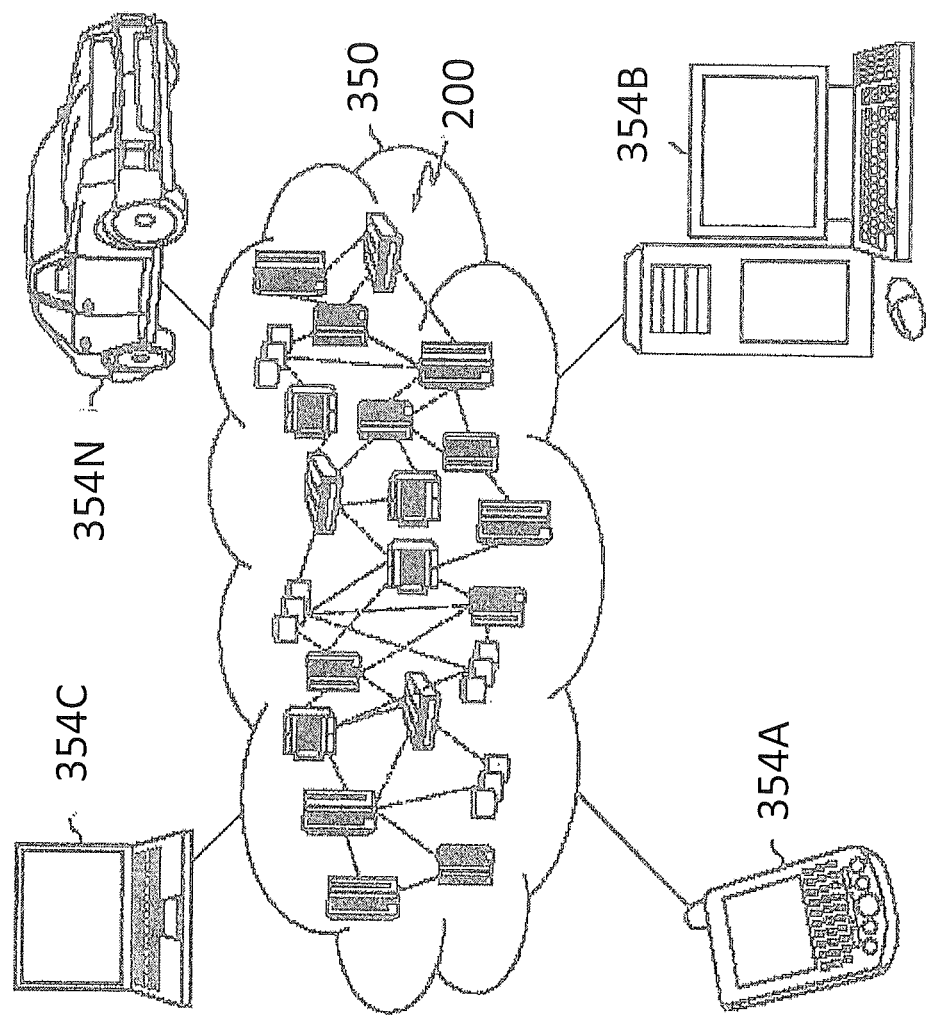
FIG. 3 depicts a cloud computing environment 300 according to an exemplary embodiment of the present invention.

Referring now to FIG. 3, an illustrative cloud computing environment 350 is depicted. As shown, cloud computing environment 1150 comprises one or more cloud computing nodes 1000 with which local computing devices used by cloud consumers, such as, for example, personal digital assistant (PDA) or cellular telephone 354A, desktop computer 354B, laptop computer 354C, and/or automobile computer system 354N may communicate. Nodes 200 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 3 are intended to be illustrative only and that computing nodes 200 and cloud computing environment 350 can communicate with any type of computerized device over any type of network and/or network addressable connection (e.g., using a web browser).

Figure 4:
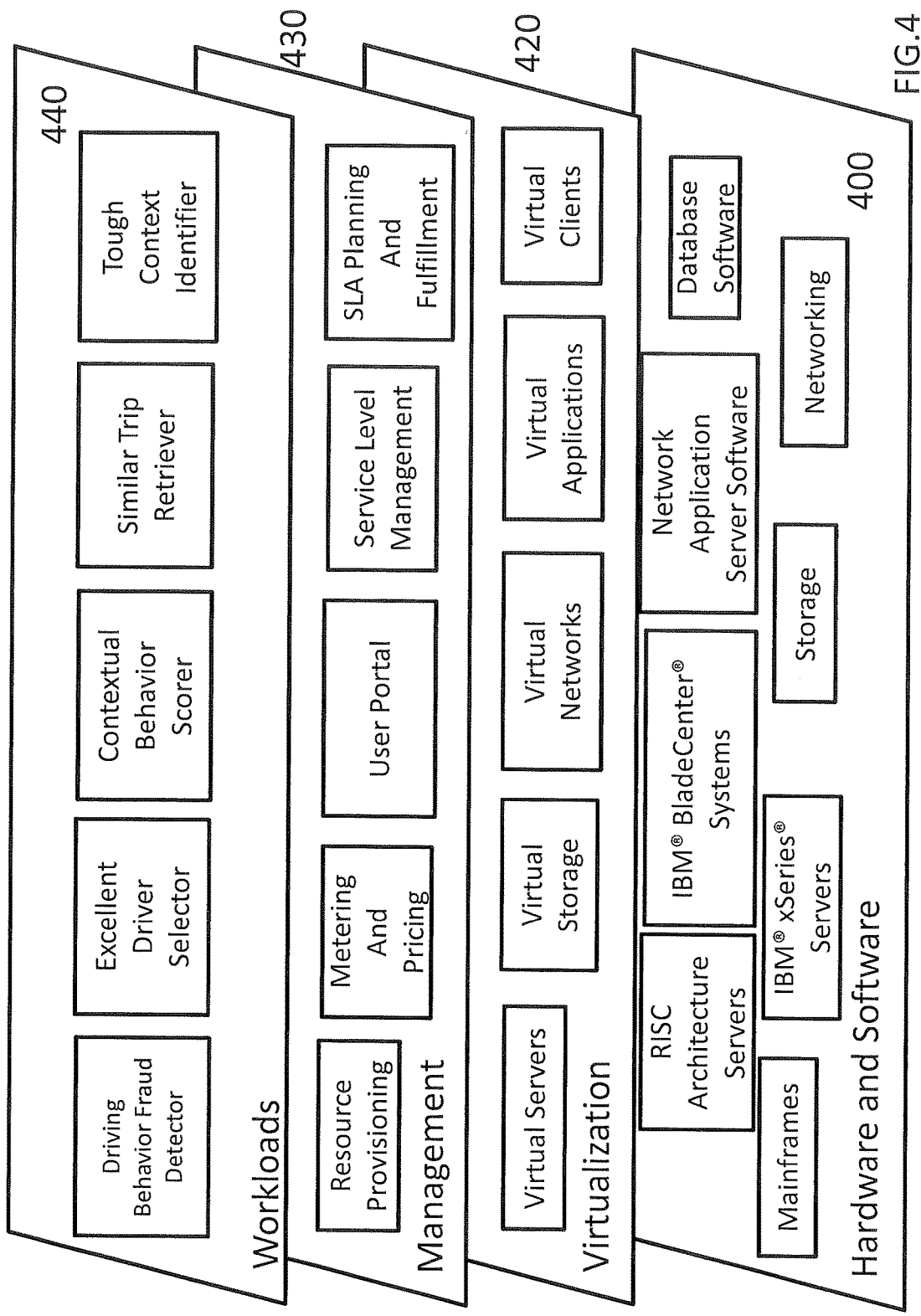
FIG. 4 depicts abstraction model layers 400-440 according to an exemplary embodiment of the present invention.

Referring now to FIG. 4, a set of functional abstraction layers provided by cloud computing environment 350 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 400 includes hardware and software components. Examples of hardware components include mainframes, in one example IBM® zSeries® systems; RISC (Reduced Instruction Set Computer) architecture based servers, in one example IBM pSeries® systems;

IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The tooling that implements the present invention would be located in layer 400.

Virtualization layer 420 provides an abstraction layer from which the following examples of virtual entities may be provided: virtual servers; virtual storage; virtual networks, including virtual private networks; virtual applications and operating systems; and virtual clients. The virtual machines and network appliances that are generated and instantiated by the tooling of the present invention would operate on layer 420.

In one example, management layer 430 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment module provides pre-arrangement for, and procurement of, cloud computing resources for which a future requirement is anticipated in accordance with an SLA.

Workloads layer 440 provides examples of functionality for which the cloud computing environment may be utilized. Examples of workloads and functions which may be provided from this layer might include any number of functions and applications not even related to the present invention, such as mapping and navigation; software development and lifecycle management; virtual classroom education delivery; data analytics processing; transaction processing; and, more particularly relative to the present invention, security enforcement modules implementing the method shown in FIG. 1.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for verifying a software program for security, the method comprising:
   retrieving from a memory a program to be verified against a security policy and a security specification defining said security policy, the retrieved program comprising only static code available for evaluation before additional code is added during a dynamic linking of an execution of said program;
   applying a static program analysis on said static code of said program, using a processor on a computer, to determine whether said static code of said program is compatible with said security specification; and
   if a determination is made by said static program analysis that said static code of said program is incompatible with said security specification, rejecting said program as non-compliant; and
   else, the determination is made by said static program analysis that said static code of said program is compatible with said security specification, then building a call-graph representation of said program for use to evaluate any dynamically-loaded code during an execution of said program, and indicating paths of said call-graph representation that reach at least one policy-relevant operation during the execution,
   wherein the static analysis first statically determines whether the static code of said program complies with all security policies in the security specification prior to any dynamic code loading, the program to be then dynamically checked only for aspects that were not verified during said static analysis.

2. The method of claim 1, further comprising:
   during any of a dynamic loading of code during execution of said program, determining whether any said paths of said call-graph representation indicated as reaching at least one policy-relevant operation have been dynamically loaded;
   if it is determined that no paths indicated as reaching at least one policy-relevant operation have been dynamically loaded, determining that said dynamic loading is verified for said security policy; and
   if it is determined that any paths indicated as reaching at least one policy-relevant operation have been dynamically loaded in a call chain, then determining whether each said dynamically-loaded path in said call chain is compatible with said security policy.

3. The method of claim 2, further comprising:
   if it is determined that all paths in the call chain indicated as reaching at least one policy-relevant operation and have been dynamically loaded are compatible with said security specification, determining that said dynamic loading is verified for said security policy; and
   rejecting said program if it is determined that any of said paths indicated as reaching at least one policy-relevant operation and has been dynamically loaded is incompatible with said security specification.

4. The method of claim 1, wherein said static analysis comprises a taint tracking in which the static analysis starts at an application program interface (API) service that reads private fields, checks whether such APIs reach any internet APIs, and flags a violation if any internet API addresses a domain that is not statically known or not compatible with a whitelist.

5. The method of claim 1, wherein said static analysis issues an objection if the static analysis determines that any security-critical operation would be executed from dynamically-loaded code.

6. A non-transitory storage medium having tangibly embodied thereon a set of computer-readable claims that cause a computer to execute the method of claim 1.

7. The non-transitory storage medium of claim 6, wherein said method further comprises:
   during any of a dynamic loading of code during an execution of said program, determining whether any said paths of said call-graph representation indicated as reaching at least one policy-relevant operation have been dynamically loaded;
   if it is determined that no paths indicated as reaching at least one policy-relevant operation have been dynamically loaded, determining that said dynamic loading is verified for said security policy; and
   if it is determined that any paths indicated as reaching at least one policy-relevant operation have been dynamically loaded, then determining whether each said dynamically-loaded path is compatible with said security policy.

8. The non-transitory storage medium of claim 7, wherein said method further comprises:
   if it is determined that all paths indicated as reaching at least one policy-relevant operation and have been dynamically loaded are compatible with said security specification, determining that said dynamic loading is verified for said security policy; and
   rejecting said program if it is determined that any of said paths indicated as reaching at least one policy-relevant operation and have been dynamically loaded are incompatible with said security specification.

9. The non-transitory storage medium of claim 8, as comprising one of:
   a memory in a processor-based device that stores programs that can selectively-executed by a processor in said processor-based device or that can be selectively transmitted to another processor-based device via a network;
   a memory of said processor-based device that stores programs currently being executed by said processor-based device; and
   a standalone memory device that can be selectively inserted into an input port of said processor-based device.

10. The non-transitory storage medium of claim 6, wherein said static analysis comprises a taint tracking in which the static analysis starts at an application program interface (API) service that read private fields and checks whether such APIs reach any internet APIs and flags a violation if any internet API addresses a domain that is not statically known or not compatible with a whitelist.

11. The non-transitory storage medium of claim 6, wherein said static analysis issues an objection if the static analysis determines that any security-critical operation would be invoked during execution of dynamically-loaded code.

12. An apparatus, comprising:
   a processor; and
   a memory system accessible to said processor,
   wherein said memory system has stored therein a set of computer-readable instructions that instruct said processor to execute a method for verifying a program for compliance with a security policy and a security specification, the program comprising static code that is statically declared but having no code that is to be dynamically-loaded during an execution of said program, said method comprising:
      retrieving from a memory a program to be verified against a security policy and a security specification defining said security policy;
      applying a static program analysis on static code of said program, using a processor on a computer, to determine whether said program is compatible with said security specification, the static program analysis verifying security compliance on the static code that is statically declared; and
         if a determination is made by said static program analysis that said static code of said program is incompatible with said security specification, rejecting said program as non-compliant; and
         else, the determination is made by said static program analysis that said static code of said program is compatible with said security specification, then building a call-graph representation of said program for use to evaluate any dynamically-loaded code during an execution of said program, and indicating paths of said call-graph representation that reach at least one policy-relevant operation during the execution,
      wherein the static analysis first statically determines whether the static code of said program complies with all security policies in the security specification prior to any dynamic code loading, the program to be then dynamically checked only for aspects that were not verified during said static analysis.

13. The apparatus of claim 12, wherein said method further comprises:
   during any of a dynamic loading of code during execution of said program, determining whether any said paths of said call-graph representation indicated as reaching at least one policy-relevant operation have been dynamically loaded;
   if it is determined that no paths indicated as reaching at least one policy-relevant operation have been dynamically loaded, determining that said dynamic loading is verified for said security policy; and
   if it is determined that any paths indicated as reaching at least one policy-relevant operation have been dynamically loaded, then determining whether each said dynamically-loaded path is compatible with said security policy.

14. The apparatus of claim 13, wherein said method further comprises:
   if it is determined that all paths indicated as reaching at least one policy-relevant operation and have been dynamically loaded are compatible with said security specification, determining that said dynamic loading is verified for said security policy; and
   rejecting said program if it is determined that any of said paths indicated as reaching at least one policy-relevant operation and has been dynamically loaded is incompatible with said security specification.

15. The apparatus of claim 14, as comprising one of a mobile device, a desktop computer, a server on a network, and a computer providing a cloud service.

16. A method for verifying a software program for security, the method comprising:

retrieving from a memory a program to be verified against a security policy and a security specification defining said security policy;

applying a static program analysis on a static portion of said program, using a processor on a computer, to determine whether said static portion is compatible with said security specification; and if a determination is made by said static program analysis that said static code of said program is incompatible with said security specification, rejecting said program as non-compliant; and else, the determination is made by said static program analysis that said static code of said program is compatible with said security specification, then building a call-graph representation of said program for use to evaluate any dynamically-loaded code during an execution of said program, and indicating paths of said call-graph representation that reach at least one policy-relevant operation during the execution, wherein the static analysis first statically determines whether the static code of said program complies with all security policies in the security specification prior to any dynamic code loading, the program to be then dynamically checked only for aspects that were not verified during said static analysis.

17. The method of claim 16, wherein the static analysis initially statically determines whether all security policies in the security policy hold over the static portion of said program prior to any dynamic code loading and wherein the indications of paths of the program that reach at least one policy-relevant operation permit the program to be checked at execution only for aspects that were not verified during said static analysis.

18. The method of claim 17, further comprising:

retrieving the program from the memory for execution, along with the associated call-graph representation of the program;

adding dynamic code necessary for execution of the program, the added dynamic code not having been present in the static portion of said program during the static program analysis;

determining, from the indications of the associated call-graph representation of the program, which paths of the program to verify prior to execution of the program as compatible with said security specification;

dynamically analyzing the program to determine whether said program is compatible with said security specification by checking only those paths of the program that will be executed and that are indicated on the associated call-graph representation as reaching at least one policy-relevant operation when dynamically-coded is added to the program; and rejecting said program as non-compliant when it is determined by said dynamic analyzing that at least one path indicated on the call-graph that will be executed is incompatible with said security specification; and executing the program when it is determined by said dynamic analyzing that all paths including dynamically-added code that will be executed in the execution of said program are compatible with said security specification.

* * * * *